Jan. 2, 1940.　　　　　H. R. JENSEN　　　　　2,185,689
MAP
Filed Oct. 17, 1938

PRINTED TRANSPARENT RUBBER SHEET
SPONGE RUBBER
FABRIC BACK

PRINTED TRANSPARENT RUBBER SHEET

Herbert R Jensen INVENTOR.

BY H. F. Woodward
ATTORNEY.

Patented Jan. 2, 1940

2,185,689

UNITED STATES PATENT OFFICE 2,185,689

MAP

Herbert R. Jensen, Minneapolis, Minn.

Application October 17, 1938, Serial No. 235,320

3 Claims. (Cl. 35—41)

The invention relates to maps and more particularly to relief maps which are light and flexible.

Broadly stated, the present invention relates generally to improvements in maps and method of making.

An object of the invention is to provide relief maps of plane, globular and spherical types which are light and flexible.

A further object of the invention relates to relief maps made of rubber and more particularly made of sponge rubber.

Other objects of the invention will appear in the course of the following description, and the invention resides in the novel features and combination of parts which will be more particularly pointed out in the appended claims.

The invention is capable of numerous forms and variations without departing from the essential features herein disclosed. It is therefore intended and desired that the embodiment shown herein be deemed illustrative and not restrictive, and that the patent shall cover whatever features of patentable novelty that exist in the invention disclosed; references being had to the appended claims rather than to the specific description herein to indicate the scope of the invention.

In the drawing forming part of this application, similar characters of reference indicate corresponding parts in all the views.

Figure 1:
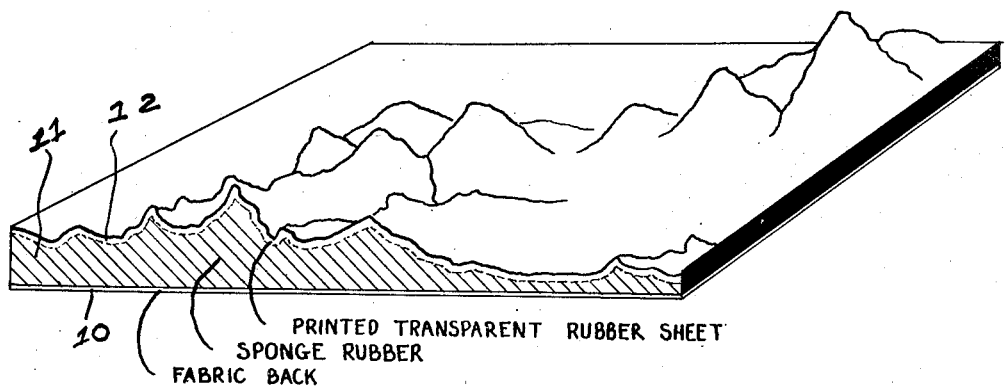
Figure 1 is plane view of a portion of a map embodying the invention.
Figure 2:
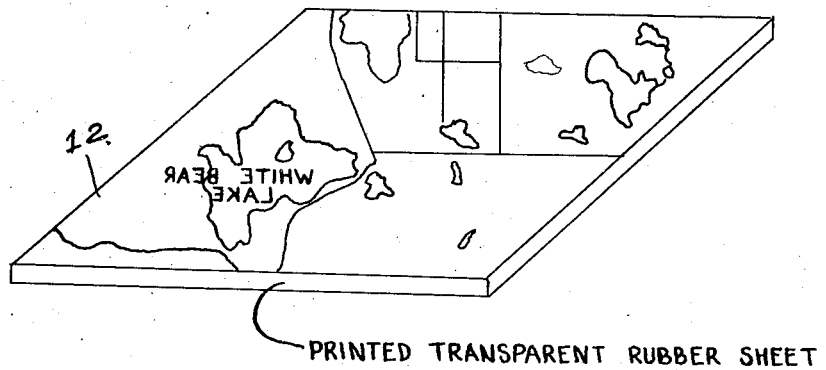
Figure 2 is an enlarged view of the flexible cover sheet for the maps.

In carrying out the invention a mold of the desired configuration of the earth's surface to a definite scale is made. A mold is so constructed that it can be placed in the various types of hot presses commonly now in use in various types of industrial work.

A sheet of prepared material such as used in making sponge rubber is placed in the mold between the upper and lower sections. It is to be understood that any suitable material may be used which will give a light, flexible map.

A sheet of transparent gum rubber or the like, having printed on one surface in reverse the necessary markings to indicate rivers, lakes, towns, etc. This relatively thin sheet of gum rubber is placed on the prepared sheet of material with the printed or written material next to the prepared sheet.

The mold containing the prepared sheet of material and the transparent gum sheet are placed in the press and sufficient heat applied to cause the chemical reaction in the prepared material and the vulcanizing of the thin transparent sheet to base material.

The action of the heat causes the prepared sheet of material to raise similar to the action of yeast in bread, which forces the rubber into the mold pattern.

It is to be understood that the mold must be constructed in such manner that the type of map desired, plane, globular or spherical is produced.

When making small spherical or globular maps, it is generally preferred that they be solid, but in the larger sizes they are preferably hollow and generally provided with an air bladder similar to those used in inflating basketballs and footballs.

In a modified form of the invention there is provided a fabric backing or base for the sheet of sponge rubber or other similar material.

Referring to the drawing in detail, 10 indicates a fabric material, 11 indicates sponge rubber or other similar material. Vulcanized to material 11 is transparent sheet material 12.

The transparent sheet material 12 will have printed on one side in reverse, rivers, towns, etc. It is to be understood that the towns, etc., may be written or otherwise made on the transparent sheet.

Some of the advantages of a map made in accordance with my invention are low cost of production, light weight, unbreakableness, and maps that may be easily moved from one place to another.

The method of decorating the maps insures accurate surfaces and prevents any mutilation of the printed information.

For educational uses small symbols representing trees, oil wells, coal mines, etc., may be made of rubber or plastics which are provided with a sharp point. These symbols can be secured to the relief map at the desired location.

By relief map as used in this specification and claims it is intended to mean maps showing configurations of the earth's surface, both natural and those erected by man.

By printing on the transparent flexible sheet as used herein means the forming on the sheet information such as relates to the land covered by the map.

Transparent flexible sheet as used herein is intended to cover any material upon which can be printed information, etc., on one side and which printed material can be read from the other side. Materials that are translucent or semi-transparent have been found to give satisfactory results.

What I claim is:

1. A relief map adapted to be collapsed and returned to its original form comprising a thin sponge rubber base conforming to the contour of the land represented by the map, and a transparent sheet of rubber secured to said base, said transparent sheet having map indicia of color contrasting to the color of the base on the side adjacent the base.

2. A relief map adapted to be collapsed and returned to its original form comprising a thin sponge rubber base, conforming to the contour of the land represented by the map, and a transparent sheet secured to said base, said transparent sheet having map indicia of color contrasting to the color of the base on the side adjacent the base.

3. A relief map adapted to be collapsed and returned to its original form comprising a thin flexible base, conforming to the contour of the land represented by the map, and a transparent sheet secured to said base, said transparent sheet having map indicia of color contrasting the color of the base on the side adjacent the base.

HERBERT R. JENSEN.